United States Patent
Fickey et al.

(10) Patent No.: US 7,975,286 B1
(45) Date of Patent: Jul. 5, 2011

(54) METHOD AND APPARATUS FOR EVALUATING ASSETS FOR COMPLIANCE TO A SECURITY POLICY

(75) Inventors: Kathryn Lynn Fickey, Jacksonville, NC (US); William A. O'Hern, Spring Lake, NJ (US); John Francis Wallace, Chester, NJ (US); Debra Ann Walling, Freehold, NJ (US); Deborah Ann Wilkinson, Loganville, GA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1224 days.

(21) Appl. No.: 11/645,903

(22) Filed: Dec. 27, 2006

(51) Int. Cl.
*G06F 17/00* (2006.01)

(52) U.S. Cl. .................... 726/1; 726/4; 726/12; 726/14; 726/15; 726/25

(58) Field of Classification Search .................. 726/1
See application file for complete search history.

(56) References Cited

U.S. PATENT DOCUMENTS

| | | | |
|---|---|---|---|
| 5,991,877 A * | 11/1999 | Luckenbaugh | 726/1 |
| 7,249,187 B2 * | 7/2007 | Sobel et al. | 709/229 |
| 7,360,237 B2 * | 4/2008 | Engle et al. | 726/1 |
| 7,428,753 B2 * | 9/2008 | Engle et al. | 726/12 |
| 7,689,722 B1 * | 3/2010 | Timms et al. | 709/249 |
| 2002/0091942 A1 * | 7/2002 | Cooper et al. | 713/201 |
| 2003/0061506 A1 * | 3/2003 | Cooper et al. | 713/201 |
| 2005/0010820 A1 * | 1/2005 | Jacobson | 713/201 |
| 2005/0076243 A1 * | 4/2005 | Morohashi et al. | 713/201 |
| 2005/0273850 A1 * | 12/2005 | Freund | 726/14 |
| 2006/0026688 A1 * | 2/2006 | Shah | 726/25 |
| 2006/0161653 A1 * | 7/2006 | Webb et al. | 709/224 |
| 2007/0101405 A1 * | 5/2007 | Engle et al. | 726/4 |
| 2008/0075088 A1 * | 3/2008 | Carrasco | 370/395.5 |
| 2008/0155677 A1 * | 6/2008 | Hossain et al. | 726/15 |

* cited by examiner

*Primary Examiner* — Kambiz Zand
*Assistant Examiner* — Yonas Bayou

(57) ABSTRACT

A method and apparatus for evaluating one or more assets for compliance to at least one network security policy are disclosed. For example, the method receives a request for evaluating at least one asset for compliance to at least one security policy. The method then performs an evaluation of compliance on the at least one asset to determine compliance of the at least one asset to the at least one security policy. The method then records a result of the evaluation of compliance into a database. Finally, the method tracks the at least one asset that has been deemed to be non-compliant to the at least one security policy over a period of time.

20 Claims, 7 Drawing Sheets

TOP VULNERABILITIES 300

| APPLICATION SCAN 301 | DATABASE SCAN 302 | NETWORK SCAN 303 | SOFTWARE 304 |
|---|---|---|---|
| APPLICATION REACHED AN UNDEFINED STATE | BFILENAME BUFFER OVERFLOW | OPENSSH AFS AND KERBEROS BUFFER OVERFLOW | AXENT LOADED SERVER IN RED STATUS |
| ARBITRARY FILE RETRIEVAL USING THE 'POISON NULL BYTE' ATTACK | CREATE LIBRARY PRIVILEGE | OPENSSH CHALLENGE-RESPONSE AUTHENTICATION BUFFER OVERFLOW | AXENT NOT LOADED |
| BLIND SQL INJECTION MAY BE POSSIBLE | DATABASE LINK BUFFER OVERFLOW | OPENSSH ONE-OFF MEMORY OVERWRITE | AXENT LOADED NO POLICY RUN |
| CLIENT SIDE EXECUTION OF MALICIOUS SCRIPTS (CSS) | DEFAULT DATABASE PASSWORD | OPENSSH USELOGIN 2.2.1 | |
| HTTP RESPONSE SPLITTING | EASILY-GUESSED DATABASE PASSWORD | OPENSSH USELOGIN 3.0.2 | |
| MICROSOFT IIS .PRINTER BUFFER OVERFLOW | PASSWORD FOR DATABASE USER SAME AS USERNAME | SENDMAIL HEADER PROCESSING BUFFER OVERFLOW | |
| PERMISSIONS PROBLEMS WITH FRONTPAGE EXTENSIONS | PRIVILEGE TO EXECUTE UTL_FILE GRANTED TO PUBLIC | SENDMAIL NOCHAR ADDRESS HEADER BUFFER OVERFLOW / DNS MAPS REMOTE DENIAL-OF-SERVICE | |
| APPLICATION PARAMETERS OUT OF RANGE | PROFILE SETTINGS - FAILED LOGIN ATTEMPTS | SSH CLEARTEXT LOGIN MEMORY VULNERABILITY | |
| SQL INJECTION MAY BE POSSIBLE | SSL VULNERABILITIES | SSH MULTIPLE BUFFER OVERFLOWS VULNERABILITY | |
| UNAUTHORIZED FILE DOWNLOAD | USERNAME BUFFER OVERFLOW | WU-FTPD GLOB HEAP CORRUPTION | |

METHOD AND APPARATUS FOR EVALUATING ASSETS FOR COMPLIANCE TO A SECURITY POLICY

The present invention relates generally to protection of networks and, in particular, to a method and apparatus for evaluating network assets for compliance to a security policy.

BACKGROUND OF THE INVENTION

Many of today's business and consumer applications rely on communications infrastructures such as the Internet. Businesses and consumers need to provide protection to their computer systems from hostile activities, e.g., denial of service attacks, spam, etc., while being able to communicate with others via the network infrastructure. Often, the businesses and consumers establish a security policy to guard against unauthorized access to network assets such as routers, switches, computers, databases, applications, etc. However, lack of compliance to the established security policy may still compromise the integrity of networks even when the security policy has been created. For example, required upgrades of software may not be performed by all employees with access to an enterprise network. Businesses need to identify security vulnerabilities on assets and perform remedies in a timely manner.

Therefore, there is a need for a method and apparatus that enables network service providers to evaluate assets for compliance to a network security policy.

SUMMARY OF THE INVENTION

In one embodiment, the present invention discloses a method and apparatus for evaluating one or more assets for compliance to at least one network security policy. For example, the method receives a request for evaluating at least one asset for compliance to at least one security policy. The method then performs an evaluation of compliance on the at least one asset to determine compliance of the at least one asset to the at least one security policy. The method then records a result of the evaluation of compliance into a database. Finally, the method tracks the at least one asset that has been deemed to be non-compliant to the at least one security policy over a period of time.

BRIEF DESCRIPTION OF THE DRAWINGS

The teaching of the present invention can be readily understood by considering the following detailed description in conjunction with the accompanying drawings, in which:

FIG. 3 illustrates an example of a report that provides vulnerabilities;

To facilitate understanding, identical reference numerals have been used, where possible, to designate identical elements that are common to the figures.

DETAILED DESCRIPTION

The present invention broadly discloses a method and apparatus for evaluating assets for compliance to at least one security policy on one or more networks such as a service provider's network, a customer network, etc. Although the present invention is discussed below in the context of packet networks such as Internet Protocol (IP) networks, the present invention is not so limited. Namely, the present invention can be applied to other networks, such as the Time Division Multiplexed (TDM) network, a wireless network and the like.

Figure 1:
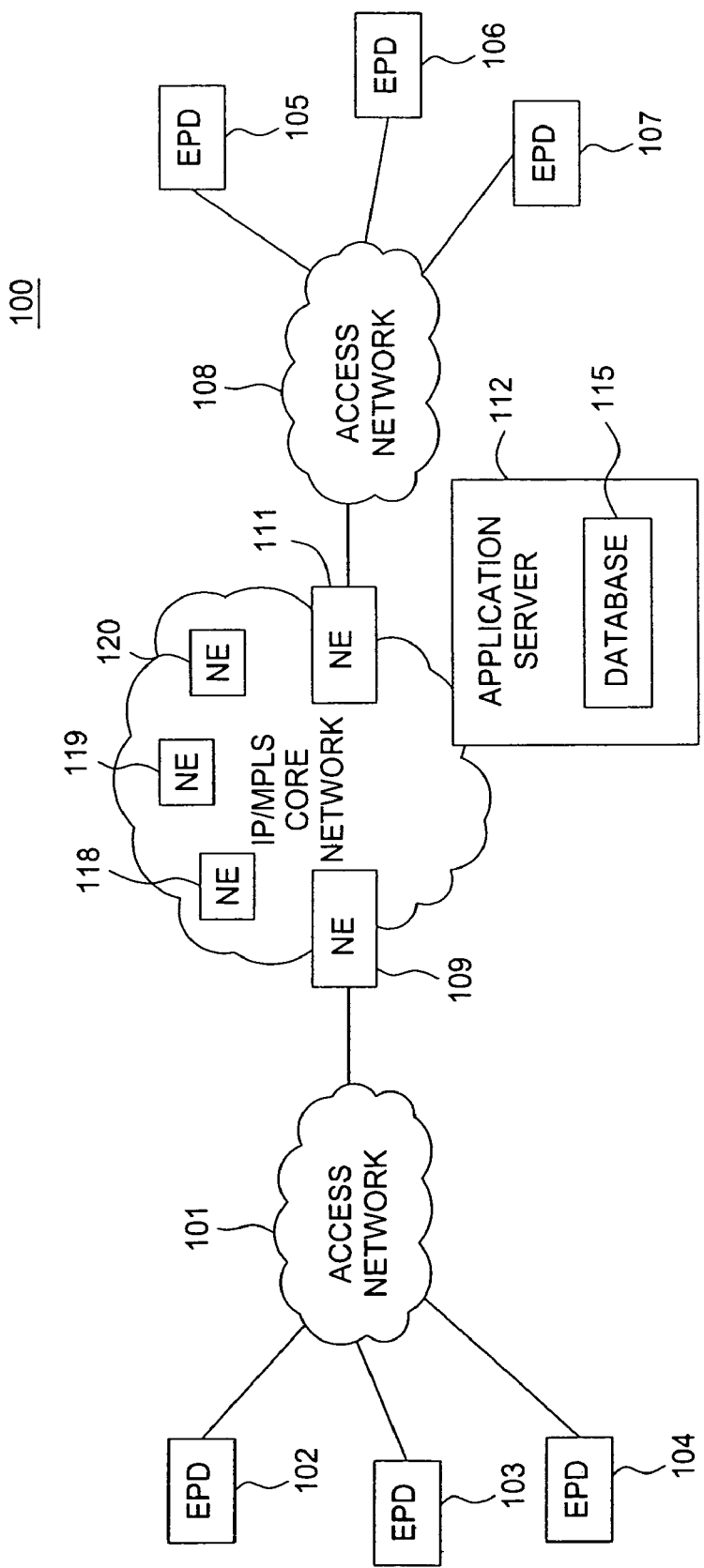
FIG. 1 illustrates an exemplary network related to the present invention.

FIG. 1 is a block diagram depicting an exemplary communication system or network 100 constructed in accordance with one or more aspects of the invention. In one embodiment, a plurality of endpoint devices, 102-104, are configured for communication with an Internet Protocol over Multi-Protocol Label Switched (IP/MPLS) core packet network 110 via an access network 101. Similarly, a plurality of endpoint devices 105-107 are configured for communication with the core IP/MPLS packet network 110 (e.g., an IP based core backbone network supported by a service provider) via an access network 108. The network elements 109 and 111 may serve as gateway servers or edge routers for the network 110. Those skilled in the art will realize that although only six endpoint devices, two access networks, and five network elements (NEs) are depicted in FIG. 1, the communication system 100 may be expanded by including additional endpoint devices, access networks, and network elements without altering the present invention.

The endpoint devices 102-107 may comprise customer endpoint devices such as personal computers, laptop computers, personal digital assistants (PDAs), servers, and the like. The access networks 101 and 108 serve as a conduit to establish a connection between the endpoint devices 102-107 and the NEs 109 and 111 of the IP/MPLS core network 110. The access networks 101, 108 may each comprise a digital subscriber line (DSL) network, a broadband cable access network, a local area network (LAN), a wireless access network (WAN), and the like. Some NEs (e.g., NEs 109 and 111) reside at the edge of the IP/MPLS core infrastructure and interface with customer endpoints over various types of access networks. An NE is typically implemented as an edge router, a media gateway, a border element, a firewall, and the like. An NE may also include a network component that resides within the network (e.g., NEs 118-120) such as a honeypot, a tarpit, a mail server, an application server, a media server or like devices. The core network 110 may also comprise an application server 112 that contains or interacts with a database 115. The application server 112 may comprise any server or computer that is well known in the art (e.g., see FIG. 7 below).

The above IP network is described to provide an illustrative environment in which data are transmitted and compliance to security policy of networks and/or network components are evaluated. As discussed above, businesses and consumers often establish one or more security policies to guard against unauthorized access to network devices, databases, applications, etc. For example, businesses may instruct their employees to update antivirus software, to change passwords often, to use passwords that are difficult to guess, to backup data as often as possible, to use encryption and authentication techniques for transfer of documents, set user permissions for files/applications, etc. However, although such security policies may have been created, lack of compliance to security policy continues to compromise the integrity of networks. For example, upgrades of software may not be performed by staff in a timely manner; passwords may not be changed often, documents are sent via email without encryption and so on. Businesses need to identify security vulnerabilities and perform remedies on an ongoing basis. However, evaluation of compliance to a security policy requires expertise in networking technologies as well as expertise in how networks are attacked. For example, hackers often evolve their approach to avoid detection. As such, security policies should be updated in a timely manner to stay ahead of malicious users (or hackers). Unfortunately, developing networking and security expertise is quite costly and is often cost prohibitive for most businesses. Therefore, there is a need for a method that enables a network service provider to evaluate assets for compliance to one or more security policies for its customers.

Figure 2:
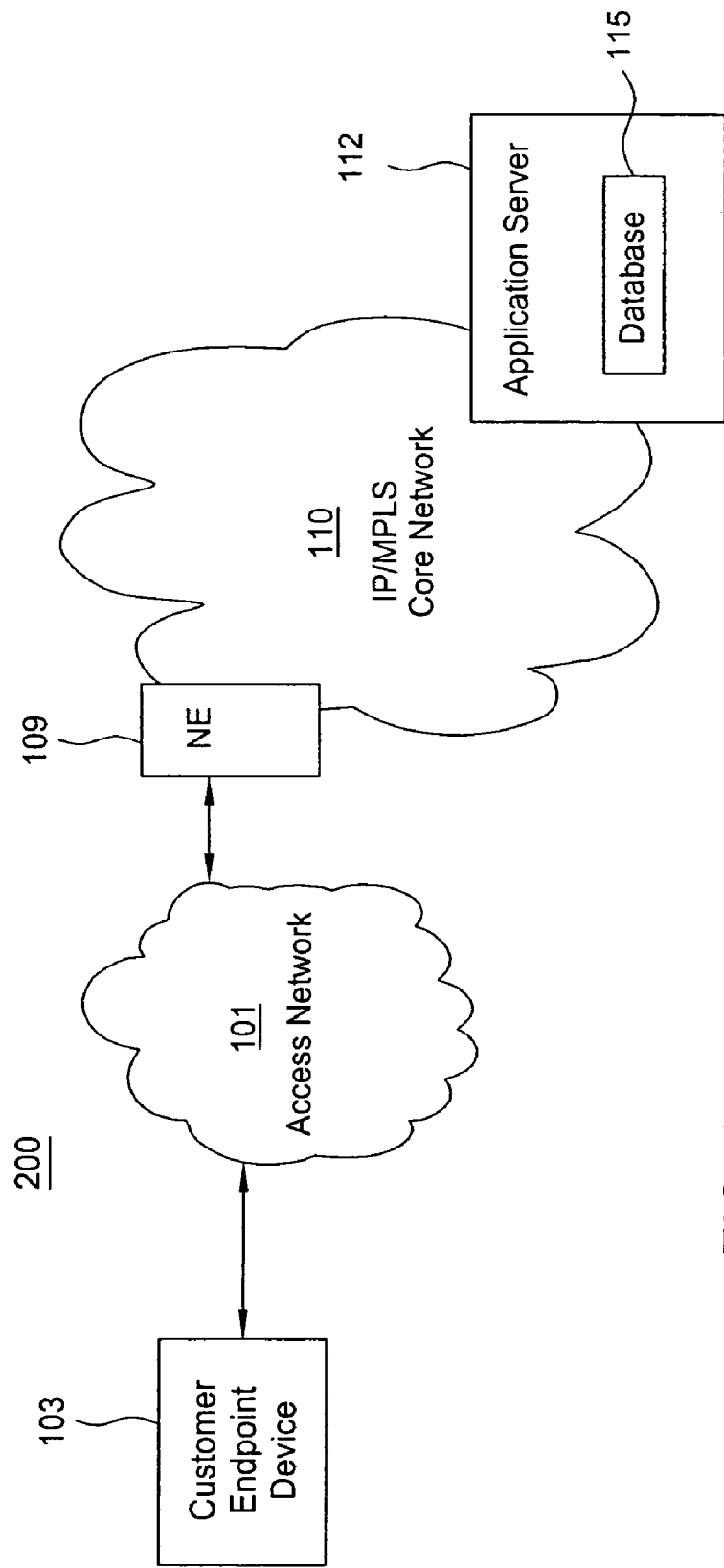
FIG. 2 illustrates an exemplary network with the current invention for evaluating compliance to security policy.

FIG. 2 provides an exemplary network 200 of the current invention for evaluating assets for compliance to one or more security policies. For example, the customer is using an endpoint device 103 to access IP/MPLS services through the access network 101. The access network is connected to the IP/MPLS core network 110 through a network element 109 (border element). In one embodiment, the application server 112 located in the IP/MPLS core network 110 is configured and tasked to evaluate the compliance of assets to one or more security policies established for the networks and/or networking components, e.g., endpoint devices, access networks, NEs, databases, servers, application software, operating systems, and the like.

In one embodiment, the application server 112 uses a database 115 that may be any type of electronic collection of data that is well known in the art. For example, the database 115 may be used by the application server 112 to store: lists of customers for a service for evaluating compliance to a security policy, lists of networks and/or networking components on which security compliance evaluation may be performed, a list of compliance and/or non-compliance records, remediation plans, data for tracking non-compliance and re-evaluation, data for generating reports, etc.

In one embodiment, the customer interacts with application server 112 to request for a service that evaluates assets for compliance to a security policy, as well as to receive reports. The customer also provides one or more lists of assets on which the compliance evaluation is to be performed and the associated security policies. For example, the security policies may be different for different types of assets, e.g., a router, a switch, a computer, a server, a modem, a terminal adaptor, a telephone, a messaging device, an operating system, a software application, or a database. It should be noted that this listing of assets is only illustrative and is not an exhaustive listing. Thus, this listing should not be interpreted to limit the present invention. Thus, in one embodiment, the pertinent security policy for each of the assets may be provided by the customer to the network service provider. This unique service allows a customer to outsource its security policy monitoring function to its network service provider. This is beneficial to the customer since its network service provider will have access to the customers' assets, and the network service provider has significant expertise and the necessary tools in networking and security policy monitoring technologies.

In one embodiment, the current invention enables a network service provider to evaluate compliance to security policies that are established for networks and/or for network components within each of the networks. The service provider implements a checklist to be used for evaluation of compliance to one or more security policies. For example, a policy may be established requiring a password for database users not to be identical to usernames. In another example, a security policy may be established requiring encryption for all email attachments that are sent to customers. As such, the above checklist may then contain auditing passwords and usernames, auditing email accounts for activated encryption techniques, and so on.

The service provider also implements tools to access assets and to evaluate assets for compliance to security policies. The assets may be databases, servers, routers, switches, endpoint devices, software applications, etc. For the above example of the email encryption policy, a tool may be triggered to access endpoint devices, e.g., computers, portable messaging devices, to check whether the email encryption policy is applicable to the endpoint devices and if so, whether the endpoint devices have been complying with the email encryption policy. For example, the tool may review a history of correspondences with customers on the endpoint devices and then evaluates all pertinent attachments to determine whether proper encryptions have been used on the attachments in accordance with the security policy. The tool may then generate one or more reports to indicate whether the endpoint devices have been complying with the security policy.

Tools for evaluating compliance to security policy may be obtained from suppliers or built by the service provider. Table-1 provides examples of tools for evaluating compliance that may be obtained from various suppliers. The table also provides a summary of the types of evaluations that may be performed. It should be noted that this listing of tools is not an exhaustive listing and is only provided as an example

TABLE 1

Examples of Tools for Evaluating Compliance to Security Policy

| Name of Tool | Vendor | Location of tool vendor | Type of compliance evaluation |
| --- | --- | --- | --- |
| AppDetective | Application Security, Inc. | New York, NY. | Data Base Scanning |
| AppScan | WatchFire | Waltham, MA. | Application Scanning |
| Foundscan | Foundscan, Inc. | Mission Viejo, CA. | Port Scanning |
| PhoneSweep | Sandstorm Enterprises, Inc. | Malden, MA. | Modem Scanning |
| Router Audit Tool (RAT) | Center for Internet Security | Hershey, PA. | Router audit |
| ESM or AXENT | Symantec | Cupertino, CA. | Enterprise Security Management |

AppDetective is a database scanner that may be used to perform penetration tests. That is, the tool may be used to locate and assess the security strength of databases applications within the network. AppDetective includes three categories of security checks: authentication, authorization, and system integrity checks. Authentication refers to identifying authorized users and determining passwords, aging of password, etc. For example, a user may have used his/her name as a password or may be using default passwords set by an administrator. Authorization refers to user permission for various resources. For example, a supervisor may have access to more information as compared to the members of a group. Authorization may also be based on project assignment basis. For example, an employee may have authorization to access data only for projects he/she is a contributing member. System integrity refers to settings that affect system resources.

For example, system integrity check may include auditing configurations, buffer overflow vulnerabilities, searching for Trojan horses, etc.

AppScan is a tool that simulates web application attacks and points to potential security loopholes to provide guidance to application developers. AppScan extends the benefits of web application security audits to all phases of the application lifecycle—from development to deployment to maintenance.

Foundscan is a tool for network-based vulnerability scanning to disclose the potential for compromise and to provide remedies to the network or systems administrator such that he/she may close the holes and enhance overall security. Foundscan may be remotely executed on routers, switches, workstations, firewalls, and servers.

PhoneSweep is a tool that may be used to detect unauthorized modems, lines with second dial tones, adequate use of warning messages, etc. PhoneSweep may also be used to attempt cracking passwords by using a customizable dictionary of commonly used username/password combinations.

The Router Audit Tool (RAT) is a tool that audits the configuration of a router for compliance with security policies. The security policies are provided as an input to the tool. RAT may access the router and download its configurations to determine compliance with established security policy.

AXENT is a software auditing tool designed to manage and enforce security data and policies across a full range of client/server platforms. These platforms include multiple UNIX platforms, Windows NT and Windows 2000, Novell NetWare, OpenVMS (Digital Equipment Corporation), and DOS/Windows on those systems that have EAC-PC installed. Examples of functions AXENT performs are managing operating system conformance with security policies, checking systems for vulnerabilities or unauthorized privileges, providing integrity checks, detecting changes to security settings or files, etc.

In one embodiment, the service provider performs the compliance evaluations using one or more tools and documents the findings or results in one or more databases. For example, the database may be used to keep records of assets, security policies for the assets, non-compliance records (vulnerabilities) for each asset, criticality of vulnerabilities, remediation plans, follow-up schedules, etc. For example, compliance evaluation of security policies for modems may require providing phone numbers associated with the modems, types of modems, the tool used to evaluate compliance, e.g. PhoneSweep. The results of the compliance evaluations by the tools are then recorded into the database.

In one embodiment, the service provider may then generate one or more reports for non-compliant assets. For example, a report may be generated for the staff, managers, departments, organizations overseeing security, etc. The report may also be based on type of vulnerability. For example, vulnerabilities may be categorized based on severity of violation and the remedy may have various schedules.

FIG. 3 illustrates an example of a report 300 that provides top vulnerabilities. For example, the report provides top vulnerabilities identified by scanning applications, databases, networks, software (e.g., using AXENT), in columns 301, 302, 303 and 304, respectively. For example, a database scan has identified a password for a database user as being the same as the username, as shown in 305.

Figure 4:
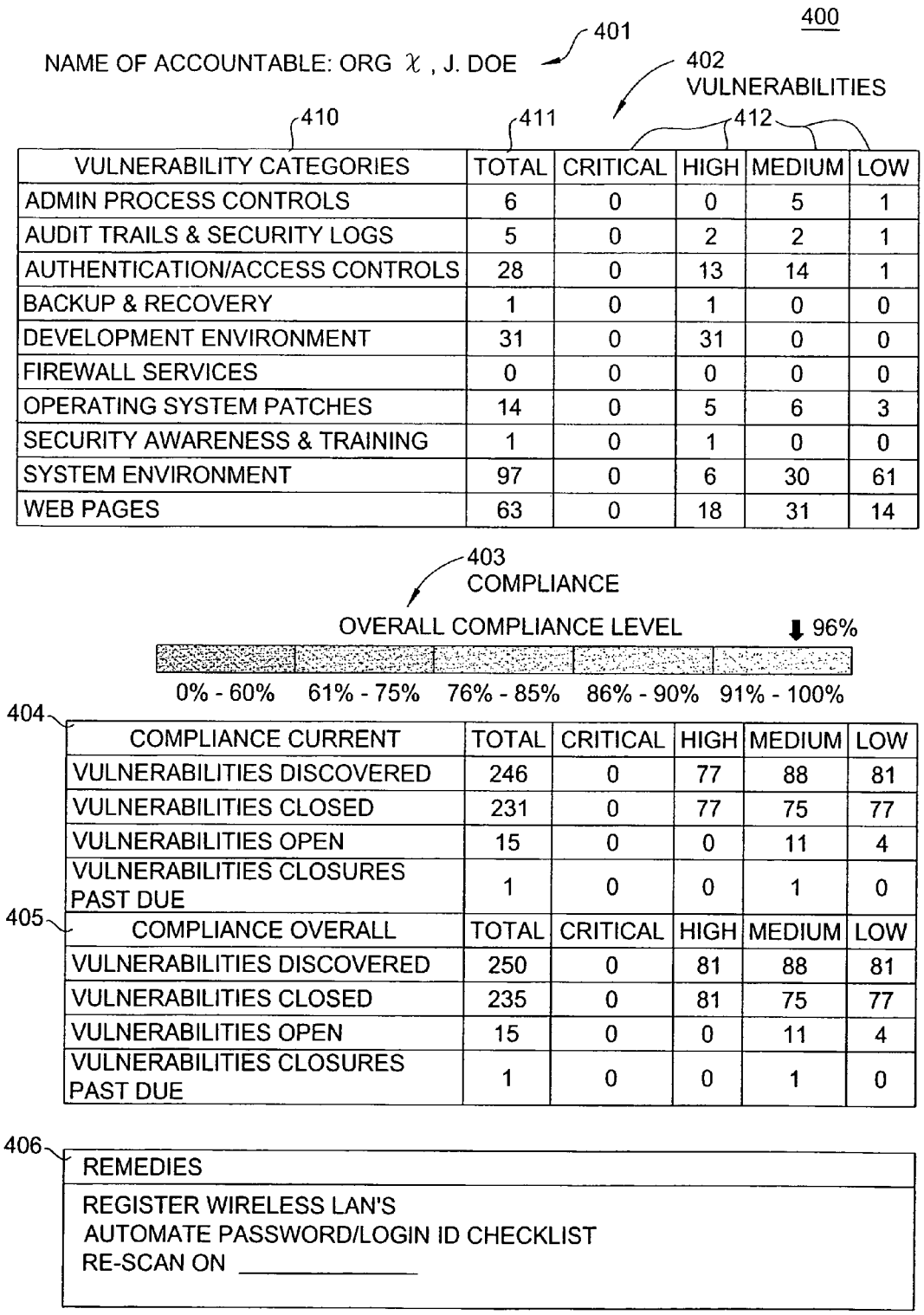
FIG. 4 illustrates an example of a report for compliance tracking.

FIG. 4 illustrates an example of a report 400 for compliance tracking. For example, the name of an accountable entity (e.g., an organization and/or a person) is shown in a report header 401. Various vulnerabilities are presented in table 402 and are categorized in column 410. For example, vulnerabilities in firewall services, backup and recovery, etc. are provided as possible categories. For each category 410, the number or instance of vulnerabilities discovered is provided in column 411. The priority (or criticality) of the vulnerability is provided in columns 412. For example, none of the vulnerabilities in report 400 were found to be mission critical. In one embodiment, the overall compliance level is illustrated in a graph 403. Current compliance and overall compliance numbers are provided in table 404 and table 405 for comparison. The report also provides proposed remedies in table 406. The report may also provide variable dates for re-scanning based on the type of vulnerability.

Figure 5:
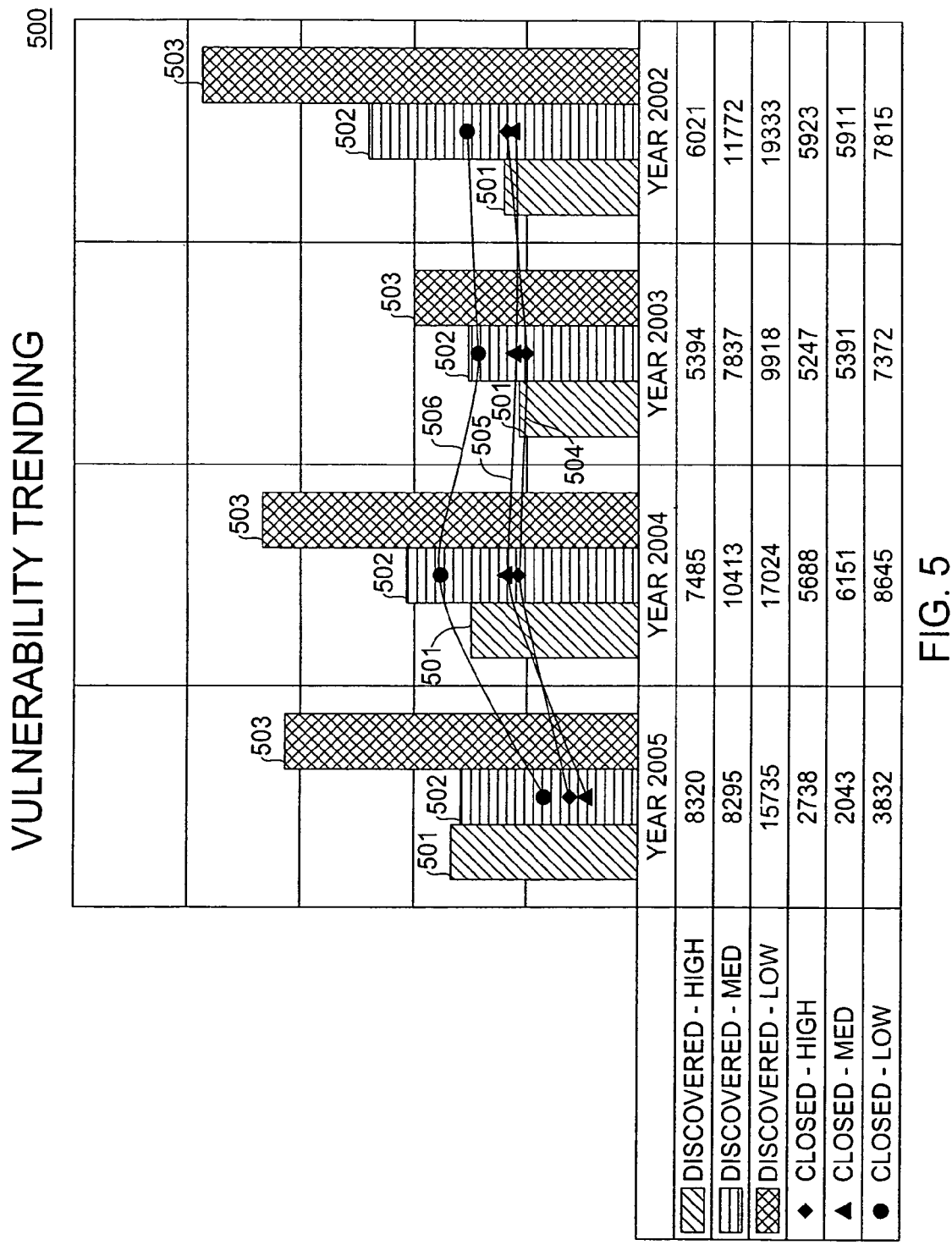
FIG. 5 illustrates an example of a report for vulnerability trending.

FIG. 5 illustrates an exemplary report 500 for non-compliance (also call vulnerability) trending. For example, the vulnerability trend is tracked for each level (high, medium, low). High severity level vulnerabilities are shown in bars 501. The medium level vulnerabilities are shown in bars 502. The low level vulnerabilities are shown in bars 503. In this example, the trend is illustrated for four (4) years. The closed (remedied) vulnerabilities are illustrated in lines 504, 505 and 506 for high, medium and low level vulnerabilities, respectively.

It should be noted that the information in the database may be used to generate various types of reports. For example, reports may be designed or tailored for executives, systems administrators, business units, organizations, and so on.

Figure 6:
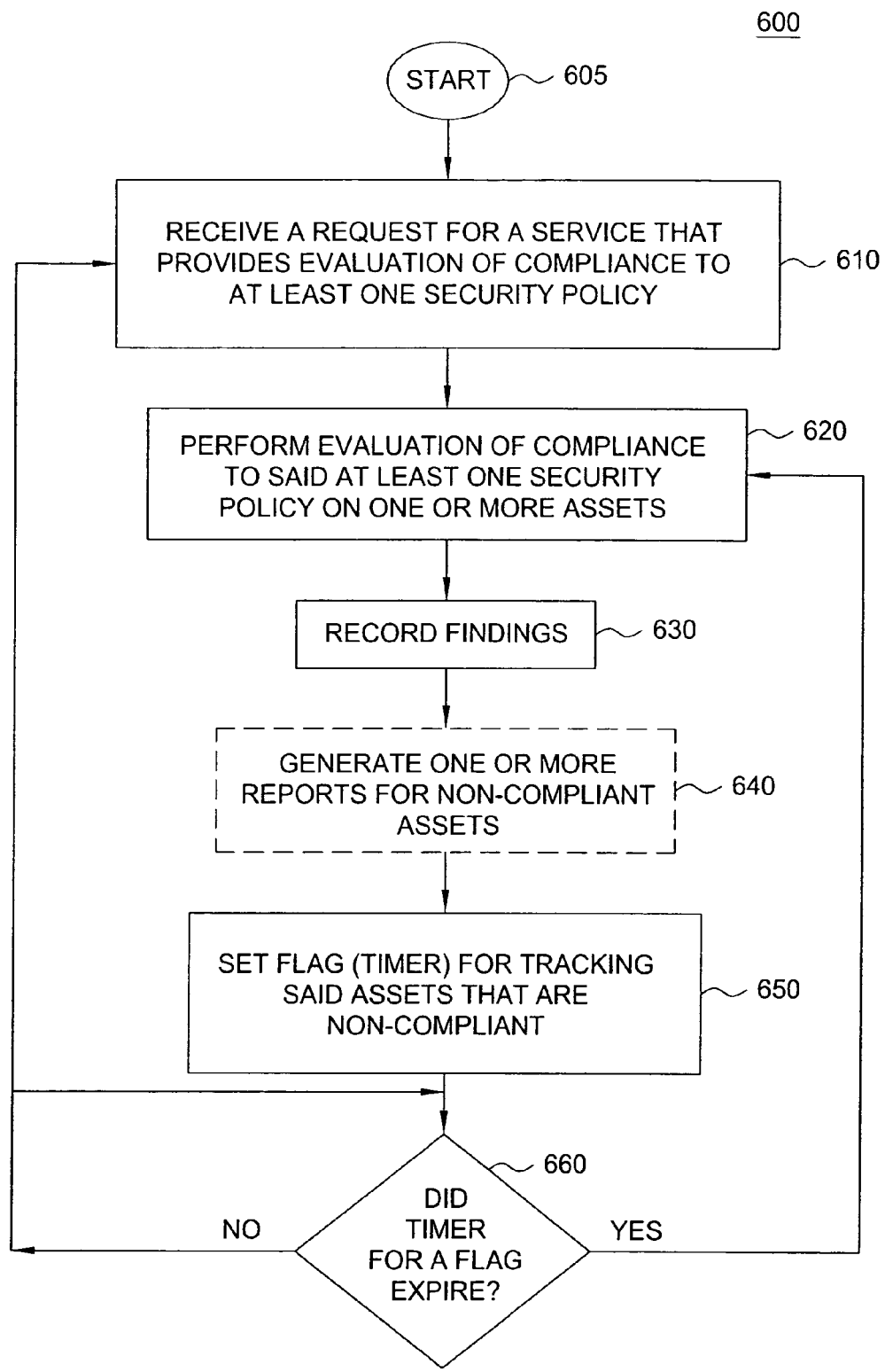
FIG. 6 illustrates a flowchart of a method for evaluating assets for compliance to security policy.

FIG. 6 illustrates a flowchart of a method 600 for evaluating assets for compliance to at least one security policy. For example, the network service provider implements tools for: evaluating compliance to one or more established security policies (e.g., identifying vulnerabilities), tracking those identified vulnerabilities/non-compliances over time, and/or providing reports to the pertinent entities. The network service provider also enables customers to interact with the service provider to request for a service that provides evaluation of compliance to the at least one security policy.

Method 600 starts in step 605 and proceeds to step 610. In step 610, method 600 receives a request for a service that provides evaluation of compliance to at least one security policy. The request may optionally provide a list of assets on which the evaluation of compliance is to be performed, and a list of security policies associated with the assets. For example, a customer subscribes to a service and provides a list of assets and associated security policies to the network service provider. For example, a customer may have a security policy regarding database access, authorization levels for access, etc.

In step 620, method 600 performs evaluation of compliance to the at least one security policy on each of the listed assets. For example, the method may use AppDetective on database assets to scan the databases and perform penetration tests. Namely, the AppDetective tool may be used to locate and assess the security strength of database assets identified in step 610.

In step 630, method 600 records the findings or results in a database of record. For example, the method may record security policy for each asset, non-compliance identified for each asset (e.g., security vulnerabilities), criticality level of non-compliance (mission critical, high, medium, low, etc.), remediation plans (fix mission critical non-compliance immediately, fix low level non-compliance within 1 month, etc.), schedule follow-up for re-evaluation of non-compliant assets, etc.

In optional step 640, method 600 generates one or more reports for non-compliant assets. For example, one or more reports may be generated for managers, organizations overseeing security, organizations or individuals impacted by the detected security vulnerabilities, organizations or individuals who caused the detected security vulnerabilities, etc. The report may be based on the type of vulnerability, the level of vulnerability, etc. For example, vulnerabilities may be categorized based on severity of violation and the remedies may have various schedules. A report may also be generated for trending over several evaluations of the compliance to the at least one security policy. For example, evaluation of compliance to the security policy may be performed annually and a report spanning multiple years may be generated to track changes and overall trend of compliance to the security policy.

In step 650, method 600 sets flags for tracking non-compliant assets over a period of time. For example, a flag may be set for high level vulnerabilities with a timer that expires in one week and another flag may be set for low level vulnerabilities with a timer that expires in one month. The length of the timer can be set in accordance with customer preferences or in accordance with application requirements.

In step 660, method 600 determines whether or not a timer for a flag has expired. For example, if a timer for a flag has expired, the method proceeds to step 620 to re-evaluate compliance, e.g., one or more tests can be again performed on the pertinent asset. In other words, the non-compliant assets are repeatedly checked for compliance until they become compliant. Otherwise, the method continues to check for expiration of flag timers and/or the method may return to step 610 to receive more requests.

Figure 7:
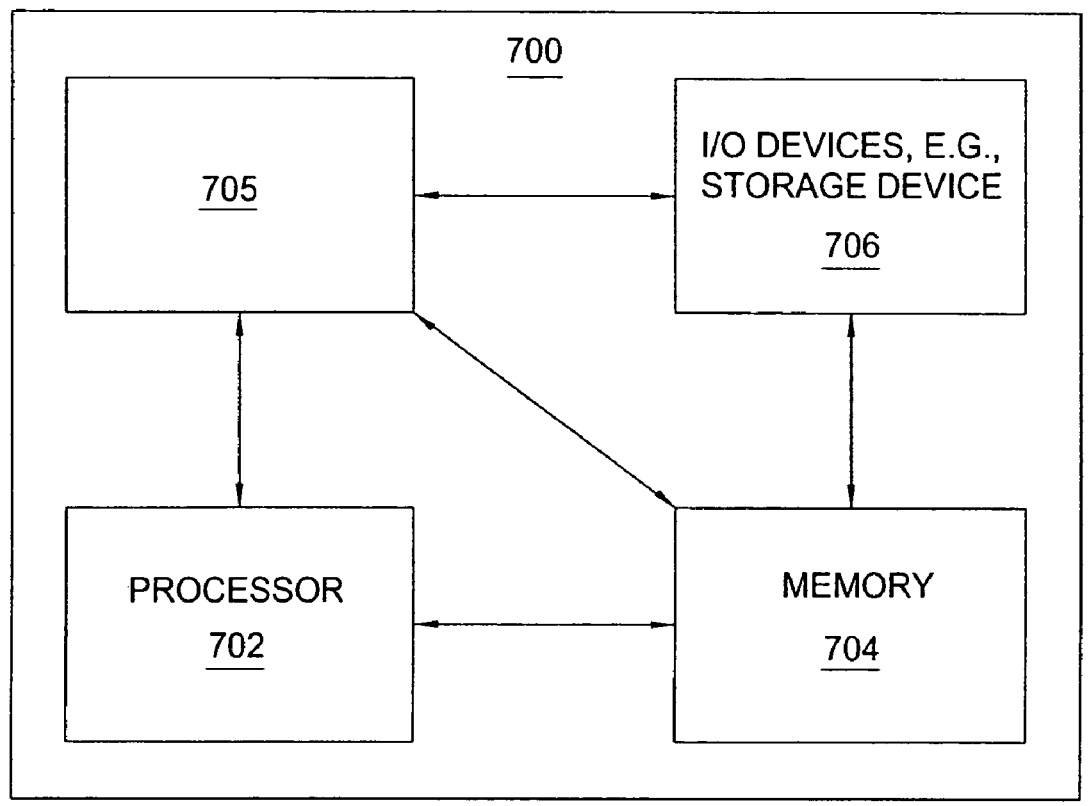
FIG. 7 illustrates a high level block diagram of a general purpose computer suitable for use in performing the functions described herein.

FIG. 7 depicts a high level block diagram of a general purpose computer suitable for use in performing the functions described herein. As depicted in FIG. 7, the system 700 comprises a processor element 702 (e.g., a CPU), a memory 704, e.g., random access memory (RAM) and/or read only memory (ROM), a module 705 for evaluating assets for compliance to a security policy, and various input/output devices 706 (e.g., network interface cards, such as 10, 100, or Gigabit Ethernet NIC cards, Fibre Channel Host Bus Adapters, Infiniband adapters, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, or entirely in hardware, e.g., using application specific integrated circuits (ASIC), a general purpose computer or any other hardware equivalents. In one embodiment, the present module or process 705 for evaluating assets for compliance to a security policy can be loaded into memory 704 and executed by processor 702 to implement the functions as discussed above. As such, the present method 705 for evaluating assets for compliance to a security policy (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for evaluating an asset for compliance to a security policy, comprising:
   receiving via a processor a request for evaluating the asset for compliance to the security policy;
   performing an evaluation of compliance on the asset to determine compliance of the asset to the security policy, wherein the performing comprises determining whether the asset has deployed the security policy;
   recording a result of the evaluation of compliance into a database; and
   tracking the asset that has been deemed to be non-compliant to the security policy over a period of time, wherein the tracking comprises:
      setting a timer for the asset that has been deemed to be non-compliant to the security policy; and
      performing the evaluation of compliance again on the asset that has been deemed to be non-compliant when the timer has expired.

2. The method of claim 1, wherein a report is generated for the asset that has been deemed to be non-compliant to the security policy.

3. The method of claim 1, wherein the asset comprises a router.

4. The method of claim 1, wherein the tracking further comprises:
   repeating the setting the timer and the performing the evaluation of non-compliance for the asset that was previously deemed to be non-compliant until the evaluation of compliance indicates that the asset is now complaint to the security policy.

5. The method of claim 1, wherein the asset that has been deemed to be non-compliant to the security policy is categorized in accordance with a severity level of non-compliance, where the severity level of non-compliance is used to set the timer.

6. The method of claim 2, wherein the report is generated for the asset that has been deemed to be non-compliant based on a severity level of non-compliance.

7. The method of claim 1, wherein the request is received from a customer of a network service provider.

8. The method of claim 7, wherein the asset and the security policy are provided by the customer.

9. The method of claim 7, wherein a report is generated for the asset that has been deemed to be non-compliant to the security policy, wherein the report is provided to the customer.

10. A non-transitory computer-readable medium having stored thereon a plurality of instructions, the plurality of instructions including instructions which, when executed by a processor, cause the processor to perform a method for evaluating an asset for compliance to a security policy, comprising:
    receiving a request for evaluating the asset for compliance to the security policy;
    performing an evaluation of compliance on the asset to determine compliance of the asset to the security policy, wherein the performing comprises determining whether the asset has deployed the security policy;
    recording a result of the evaluation of compliance into a database; and
    tracking the asset that has been deemed to be non-compliant to the security policy over a period of time, wherein the tracking comprises:
       setting a timer for the asset that has been deemed to be non-compliant to the security policy; and
       performing the evaluation of compliance again on the asset that has been deemed to be non-compliant when the timer has expired.

11. The non-transitory computer-readable medium of claim 10, wherein a report is generated for the asset that has been deemed to be non-compliant to the security policy.

12. The non-transitory computer-readable medium of claim 10, wherein the asset comprises a router.

13. The non-transitory computer-readable medium of claim 10, wherein the tracking further comprises:
   repeating the setting the timer and the performing the evaluation of non-compliance for the asset that was previously deemed to be non-compliant until the evaluation of compliance indicates that the asset is now complaint to the security policy.

14. The non-transitory computer-readable medium of claim 10, wherein the asset that has been deemed to be non-compliant to the security policy is categorized in accordance with a severity level of non-compliance, where the severity level of non-compliance is used to set the timer.

15. The non-transitory computer-readable medium of claim 11, wherein the report is generated for the asset that has been deemed to be non-compliant based on a severity level of non-compliance.

16. The non-transitory computer-readable medium of claim 10, wherein the request is received from a customer of a network service provider.

17. The non-transitory computer-readable medium of claim 16, wherein the asset and the security policy are provided by the customer.

18. An apparatus for evaluating an asset for compliance to a security policy, comprising:
   a processor configured to:
      receive a request for evaluating the asset for compliance to the security policy;
      perform an evaluation of compliance on the asset to determine compliance of the asset to the security policy, wherein the performing means determines whether the asset has deployed the security policy;
      record a result of the evaluation of compliance into a database; and
      track the asset that has been deemed to be non-compliant to the security policy over a period of time by setting a timer for the asset that has been deemed to be non-compliant to the security policy, and by performing the evaluation of compliance again on the asset that has been deemed to be non-compliant when the timer has expired.

19. The method of claim 1, wherein the asset comprises a switch.

20. The method of claim 1, wherein the asset comprises a server.

* * * * *